United States Patent
Powell, Jr. et al.

(10) Patent No.: US 9,309,366 B2
(45) Date of Patent: *Apr. 12, 2016

(54) REACTIVE FLAME RETARDANTS BLENDS FOR FLEXIBLE POLYURETHANE FOAMS

(75) Inventors: Carl H. Powell, Jr., West Lafayette, IN (US); Matthew D. Phillips, Delphi, IN (US); Stephen B. Falloon, Lafayette, IN (US)

(73) Assignee: Chemtura Corporation, Middlebury, CT (US)

( * ) Notice: Subject to any disclaimer, the term of this patent is extended or adjusted under 35 U.S.C. 154(b) by 779 days.

This patent is subject to a terminal disclaimer.

(21) Appl. No.: 13/402,266

(22) Filed: Feb. 22, 2012

(65) Prior Publication Data

US 2012/0238657 A1 Sep. 20, 2012

Related U.S. Application Data

(60) Provisional application No. 61/453,194, filed on Mar. 16, 2011.

(51) Int. Cl.
| | |
|---|---|
| *C08J 9/00* | (2006.01) |
| *C08K 5/134* | (2006.01) |
| *C08K 5/00* | (2006.01) |
| *C08K 5/03* | (2006.01) |
| *C09K 21/08* | (2006.01) |
| *C08K 5/12* | (2006.01) |
| *C08K 5/1515* | (2006.01) |

(52) U.S. Cl.
CPC .............. *C08J 9/0019* (2013.01); *C08J 9/0061* (2013.01); *C08K 5/0066* (2013.01); *C08K 5/03* (2013.01); *C08K 5/12* (2013.01); *C08K 5/134* (2013.01); *C08K 5/1515* (2013.01); *C09K 21/08* (2013.01); *C08J 2375/04* (2013.01); *C08J 2463/00* (2013.01)

(58) Field of Classification Search
CPC ........ C08L 75/04; C08K 5/0066; C08K 5/12; C08K 5/134; C08K 5/1515; C08K 5/03; C08J 2375/04; C08J 2463/00; C08J 9/0019; C08J 9/0061; C09K 21/08
See application file for complete search history.

(56) References Cited

U.S. PATENT DOCUMENTS

| | | | |
|---|---|---|---|
| 4,115,300 A * | 9/1978 | Chakirof | 521/171 |
| 5,151,216 A * | 9/1992 | Liu | 428/71 |
| 6,218,074 B1 * | 4/2001 | Dueber et al. | 430/273.1 |
| 7,153,901 B2 | 12/2006 | Hussain et al. | |
| 2002/0122929 A1* | 9/2002 | Simpson et al. | 428/316.6 |
| 2003/0083394 A1* | 5/2003 | Clatty | 521/155 |
| 2004/0171709 A1 | 9/2004 | Falloon et al. | |
| 2004/0171722 A1* | 9/2004 | Brown et al. | 524/115 |
| 2006/0014846 A1* | 1/2006 | Sparks et al. | 521/155 |
| 2006/0231799 A1* | 10/2006 | DeMassa | 252/397 |
| 2007/0252116 A1* | 11/2007 | Gelmont et al. | 252/601 |
| 2007/0276055 A1* | 11/2007 | Sjerps | 521/85 |
| 2009/0143494 A1 | 6/2009 | Mack et al. | |
| 2009/0292032 A1* | 11/2009 | Gupta et al. | 521/85 |
| 2010/0056659 A1* | 3/2010 | Rosthauser et al. | 521/137 |

FOREIGN PATENT DOCUMENTS

| | | |
|---|---|---|
| EP | 0 270 094 B1 | 1/1992 |
| EP | 0 270 094 B1 | 7/1992 |
| JP | 49022499 A | 2/1974 |

OTHER PUBLICATIONS

Albemarle Corporation Data Sheet, Saytex (R) RB-79 Flame Retardant, 2 pages, 2014.
Great Lake Solutions Technical Information; PHT4-DIOL (TM), 1 page, Oct. 21, 2010.
Great Lake Solutions Technical Information; PHT4-DIOL (TM) LV, 1 page, Oct. 21, 2010.

* cited by examiner

*Primary Examiner* — John Cooney
(74) *Attorney, Agent, or Firm* — Dilworth IP, LLC

(57) ABSTRACT

A flexible polyurethane foam containing a flame retardant blend of at least one diester diol a ring-brominated aromatic compound and at least one epoxy resin.

5 Claims, No Drawings

REACTIVE FLAME RETARDANTS BLENDS FOR FLEXIBLE POLYURETHANE FOAMS

This application claims benefit under 35 USC 119(e) of U.S. provisional application No. 61/453,194, filed Mar. 16, 2011, the disclosure of which is incorporated by reference.

FIELD

This invention relates to reactive flame retardant blends for flexible polyurethane foams.

BACKGROUND

The flexible polyurethane foams that are a part or the invention are well known in the industry. Information on preparation and common reactants can be found in many resources, including the Encyclopedia of Polymer Science and Engineering, Vol. 13, copyright 1988. John Wiley & Sons, Inc. Flexible polyurethane foams are used to make resilient structural materials such as cushioning or padding materials in the furniture and automotive industries. It is known to incorporate tire-retardant compounds into such foam materials to produce combustion modified flexible foam. However, care has to be taken so that adequate fire retardancy can be achieved without adversely affecting the desired physical properties of such foam materials. Increasing concerns over volatile organic compound emission levels and odor have resulted in a desire for incorporating polymeric or reactive flame retardant compounds into flexible polyurethane foam instead of additive flame retardant compounds.

Polyurethane foam is formed by a reaction between a polyol and diisocyanate. This reaction is highly exothermic.

Recently there has been an industry trend to move to lower density polyurethane foam. One result of this trend is that as the density of the foam decreases, the exotherm generated during the preparation of the foam increases, due to the high concentration of water needed to lower the density. Specifically it is the reaction of TDI and water that generates the largest exotherm during the polyurethane reaction.

One method that has been used to reduce this large exotherm is to use an auxiliary-blowing agent such as hydrofluorocarbons, low molecular weight hydrocarbons, or carbon dioxide. The addition of the auxiliary blowing agent reduces the amount of water needed to achieve the desired density and due to the lower amount of water, the exotherm is reduced.

Many auxiliary blowing agents that have been used in the past such as freons (chlorofluorocarbons), hydrochlorofluorocarbons and methylene chloride have come under attack recently for environmental reasons. The loam industry has since sought to prepare low density foams without the use of auxiliary blowing agents.

In addition, the manufacture of combustion modified flexible foams normally involves the production of large billets or buns of foam, which are set aside to cure or to complete the polymerization reaction. Temperatures within the billet from the reaction can reach 150 to 180° C. and higher. The insulating properties of the foam maintain this temperature in the interior of the billet for an extended period of time. Thus, components which are introduced into the foam, including the flame retardant components, should, if possible, be able to withstand high temperatures and not cause scorching or charring to be visible in the foam.

A common occurrence with introducing reactive flame retardants (≥97% reactive) into standard formulations for combustion modified flexible slabstock polyurethane foam is inconsistent air permeation throughout the polymer matrix. Uniform air permeation in combustion modified flexible slabstock polyurethane foam billets is an extremely important property. Air permeation has a direct effect on foam burn results, as well as, scorch prevention. Air permeation in combustion modified flexible slabstock foam having densities ranging from 1 pcf (pound per cubic foot) through 2.5 pcf will normally maintain a uniform air permeation result between 3 random samples within the same billet. Uniform air permeation results could be characterized as not having a maximum difference of <0.5 scfm (standard cubic feet per minute). Inconsistent air permeation outside of this range has the potential to cause flammability failures within the same foam bun or lower yields and higher foam waste due to scorch.

Additionally, combustion modified flexible slabstock polyurethane foam buns commonly exhibit discoloration and/or scorch in the center of the bun due to the high heat of reaction that forms the urethane linkages. The heat of reaction can degrade residual chemicals within the polymer matrix to form color bodies. Some of those residual chemicals, such as halogenated flame retardants produce halogenated acids that breakdown the urethane linkages, especially in the center of the bun. Although exothermic heat formation is taking place within the entire polymer matrix, the center of the bun experiences the highest temperature gradient because the surrounding polyurethane foam acts as a thermal insulation barrier, retarding heat dissipation.

There is therefore significant interest in developing new reactive flame retardant blends for combustion modified flexible polyurethane foams that prevent or minimize the effects of scorch and discoloration; as well as, maintaining uniform air permeation.

For example, U.S. Pat. No. 7,153,901, incorporated herein by reference in its entirety, discloses a liquid flame retardant; additive composition which comprises a liquid mixture formed from a) at least one reaction product of a brominated aromatic diester diol and an alcohol-reactive agent; b) at least one hindered amine antioxidant; and c) at least one phenolic antioxidant in which the phenolic ring is substituted by an alkanoic acid alkyl ester group in which alkanoic acid moiety has in the range of 2 to about 4 carbon atoms and the alkyl group has in the range of about 6 to about 16 carbon atoms; wherein (1) the proportions of a) to b) are in the range of about 30:70 to about 70:30; (2) the proportions of b) to c) are in the range of about 3:1 to about 1:3; and (3) the weight ratio of a) to b) plus c) is in the range of about 5:1 to about 25:1.

U.S. Published Patent Application No. 2009/0143494 discloses flame retardant additive for polyurethanes formed from (A) at least one bis(alkanoic acid ester) of a ring-brominated aromatic diester diol; (B) liquid alkylated triphenyl phosphate having an approximate average formula $(R_xPhO)_3P{=}O)$ in which each R is, independently, a hydrogen atom or a $C_{14}$ alkyl group and x is an average number in the range of about 0.2 to 3; and (C) at least one, alicyclic phosphonate ester having 1, 2 or 3 phosphorus atoms in the molecule, at least one of which is part of an alicyclic ring system, and having a phosphorus content of at least about 15 wt %.

U.S. Published Patent Application No. 2004/0171709; incorporated herein by reference in its entirety, discloses a flexible, flame-retarded, polyurethane foam comprising brominated and/or phosphorous flame retardants and an acid scavenger selected from hydroxides, carbonates, bicarbonates, amines, zeolites, hydrotalcites and epoxides. However, the application fails to disclose or suggest a mixture of at least one brominated aromatic diester diol and an epoxy resin.

European Patent Application No. 0 270 094 discloses flame retardant thermoplastic polyurethane compositions containing a halogen flame retardant containing 0.2 to 20 parts by weight of a cycloparaffinic compound having an epoxy group.

U.S. Provisional Patent Application No. 61/292,988, filed Jan. 7, 2010, incorporated by reference herein in its entirety, discloses a process for producing a tetrabromophthalic diester composition, a liquid reaction mixture is prepared comprising tetrabromophthalic anhydride (TBPA), a $C_2$ to $C_6$ polyhydric aliphatic alcohol (PAA) and an alkylene oxide (AO) selected from the group consisting of ethylene oxide and propylene oxide, said reaction mixture being substantially free of an organic solvent. While agitating the reaction mixture, the temperature of the reaction mixture is raised to at least 50° C. to allow the TBPA to react with the PAA and AO to produce a diester composition. The reaction is terminated when the diester composition has an acid value equal to or less than 0.25 mg KOH/gin of the diester composition.

According to the present invention, a novel reactive flame retardant blend has now been developed that maintains uniform air permeation, minimizes scorch and discoloration, as well as imparting flame retardancy, to combustion modified flexible polyurethane foams. The novel blend is a mixture of at least one brominated aromatic diester diol, an epoxy resin and optionally at least one hindered phenolic anti-oxidant.

SUMMARY OF THE INVENTION

In a first embodiment, the present invention is direct to a flame retardant blend comprising the following components: (a) at least one diester diol of a ring-brominated aromatic compound; and (b) at least one epoxy resin.

Conveniently, the blend can further comprise (c) at least one hindered phenolic anti-oxidant in which the phenolic ring is substituted by at least one alkanoic alkyl ester group in which the alkanoic acid moiety has from about 2 to about 4 carbon atoms and the alkyl moiety has about 6 to about 16 carbon atoms wherein the proportions of (c) to (a) plus (b) are in the range of about 0.1:100 to about 1:100.

In a preferred embodiment, component (a) comprises a diester of tetrabromophthalic acid with a $C_2$ to $C_6$ polyhydric aliphatic alcohol and a $C_2$ to $C_8$ alkylene oxide, such as a diester of tetrabromophthalic acid with diethylene glycol and ethylene or propylene oxide.

Advantageously, component (a) has a viscosity of about 7,500 to about 130,000 cps at 25° C., preferably from about 15,000 to about 35,000 cps at 25° C.

In another embodiment, component (b) comprises at least one cycloaliphatic epoxide, such as a compound having an epoxycyclohexane ring, or even two epoxycyclohexane rings, such as where component (b) is 3',4'-epoxycyclohexylmethyl-3,4-epoxycyclohexane-carboxylate.

Advantageously, the proportions by weight of components (a) and (b) in the blend are in the range of about 98.5:1.5 to about 96.5:3.5, or even about 98:2 to about 97:3.

In another embodiment, component (c) is a liquid hindered phenol with a mixture or $C_{13}$-$C_{15}$ alcohol esters ligands, such as 3,5-bis(1,1-dimethylethyl)-4-hydroxy-benezenepropanoic acid, $C_{13\text{-}15}$ alkyl ester.

In a preferred embodiment, the proportions by weight of components (a), (b) and (c) are such that a base resin blend of 100 parts (1) the proportions of (a) to (b) are in the range of about 98.5:1.5 to about 96.5:3.5; and (2) the proportions of (c) to (a) plus (b) are in the range of about 0.1:100 to about 1:100; or even, wherein the proportions by weight of components (a), (b) and (c) are such that a base resin blend of 100 parts (1) the proportions of (a) to (b) are in the range of about 98:2 to about 97:3; and (2) the proportions of (c) to (a) plus (b) are in the range of about 0.15:100 to about 0.25:100.

In a particularly preferred embodiment, component (a) is of the formula:

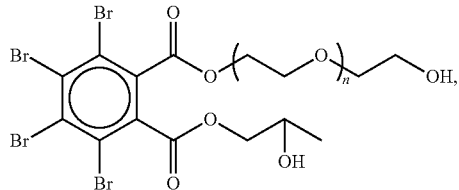

where n is in the range from about 1 to about 5.

In another embodiment, the present invention is directed to a flexible polyurethane foam, comprising a polyurethane, and a flame retardant composition of (a) at least one diester diol of a ring-brominated aromatic compound; and (b) at least one epoxy resin.

Conveniently, the foam can further comprise (c) at least one hindered phenolic anti-oxidant in which the phenolic ring is substituted by at least one alkanoic alkyl ester group in which the alkanoic acid moiety has from about 2 to about 4 carbon atoms and the alkyl group has about 6 to about 16 carbon atoms.

Advantageously, component (a) of the foam comprises a diester of tetrabromophthalic acid with a $C_2$ to $C_6$ polyhydric aliphatic alcohol and a $C_2$ to $C_8$ alkylene oxide, such as a diester of tetrabromophthalic acid with diethylene glycol and ethylene or propylene oxide.

In a further embodiment, component of the loam (a) has a viscosity of about 7,500 to about 130,000 cps at 25° C., even from about 15,000 to about 35,000 cps at 25° C.

Further, component (b) comprises at least one cycloaliphatic epoxide, such as a compound having an epoxycyclohexane ring, or even two epoxycyclohexane rings, such as where component (b) is 3',4'-epoxycyclohexylmethyl-3,4-epoxycyclohexane-carboxylate.

Advantageously, the flexible polyurethane foam has proportions by weight of components (a) and (b) in the flame retardant composition in the range of about 98.5:1.5 to about 96.5:3.5, and even about 98:2 to about 97:3.

In another embodiment, component (b) comprises at least one cycloaliphatic epoxide, such as a compound having an epoxycyclohexane ring, or even two epoxycyclohexane rings, such as where component (b) is 3',4'-epoxycyclohexylmethyl-3,4-epoxycyclohexane-carboxylate.

Advantageously, the proportions by weight of components (a) and (b) in the flame-retardant composition are in the range of about 98.5:1.5 to about 96.5:3.5, or even about 98:2 to about 97:3.

In another embodiment, component (c) is a liquid hindered phenol with a mixture of $C_{13}$-$C_{15}$ alcohol esters ligands, such as 3,5-bis(1,1-dimethylethyl)-4-hydroxy-benezenepropanoic acid, $C_{13\text{-}15}$ alkyl ester.

In a preferred embodiment, the proportions by weight of components (a), (b) and (c) are such that a base resin blend of 100 parts (1) the proportions of (a) to (h) are in the range of about 98.5:1.5 to about 96.5:3.5: and (2) the proportions of (c) to (a) plus (b) are in the range of about 0.1:100 to about 1:100; or even, wherein the proportions by weight of components (a), (b) and (c) are such that a base resin blend of 100 parts (1) the proportions of (a) to (b) are in the range of about 98:2 to about 97:3; and (2) the proportions of (c) to (a) plus (b) are in the range of about 0.15:100 to about 0.25:100.

In a preferred embodiment, component (a) of the flame retardant composition is of the formula:

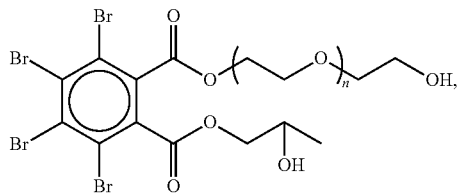

where n is in the range from about 1 to about 5.

DETAILED DESCRIPTION OF THE INVENTION

The new reactive flame retardant composition of the present invention can be used in combustion modified flexible slabstock polyurethane foams to solve the problem of inconsistent air permeability. This new reactive flame retardant is a two component liquid blend Of (a) at least one brominated aromatic diester diol and (b) at least one epoxy resin, and can optionally contain an additional component, such as (c) at least one hindered phenolic antioxidant, to improve scorch prevention. The amounts of components (a), (b) and (c) used in forming said mixture are such that in a base resin blend of 100 parts, the proportions of (a):(b) are about 98.5:1.5 to about 96.5:3.5, or even about 98:2 to about 97:3; and when component (c) is present, the relative proportion of (c):(a)+(b) is in the range of about 0.1:100 to about 1:100.

The brominated aromatic diester diol is a diester diol of tetrabromophthalic acid, which is the reaction product of tetrabromophthalic anhydride (TBPA), a $C_2$ to $C_6$ polyhydric aliphatic alcohol (PAA), preferably diethylene glycol, and a substituted or unsubstituted $C_3$ to $C_8$ alkylene oxide (AO), preferably propylene oxide. In one practical embodiment, in which the PAA is diethylene glycol and the AO is propylene oxide, the diester diol has the following formula:

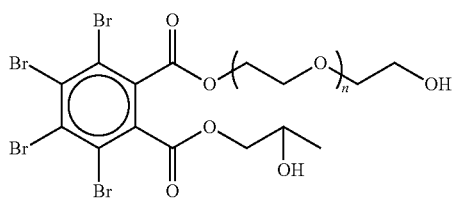

where n is typically in the range from about 1 to about 5. The synthesis of this material is disclosed in U.S. Provisional Patent Application No. 61/292,988, incorporated by reference herein in its entirety.

The diester diol has a viscosity at 25° C. of about 7,500 to about 130,000 cps, typically from about 7,500 to about 50,000 cps and especially from about 15,000 to about 35,000 cps, making the lower viscosity products suitable for use in foam applications that that have previously been excluded for equivalent materials with higher viscosity. In particular, in its low viscosity forms, the present diester diol is pourable at room temperature and can be pumped using standard machine pumps commonly used for spray polyurethane foam, flexible slab stock, flexible box pour, rigid discontinuous lamination panels, rigid continuous lamination panels, pour-in-place/molded applications; as well as, adhesive applications.

The diester diol is produced in a liquid phase process in which tetrabromophthalic anhydride (TBPA) is reacted with both a $C_2$ to $C_6$ polyhydric aliphatic alcohol (PAA) and an alkylene oxide (AO) in a single stage and in the absence of an organic solvent, such as toluene. The process typically involves adding the TBPA to the PAA to form a thick but stirrable slurry. Potassium hydroxide is then normally added to the slurry both to neutralize residual acid from the TBPA and to act as a chain extension catalyst to control the overall molecular weight and viscosity of the product. The AO is then added to slurry and the ingredients are blended together to form a homogeneous reaction mixture having the following molar composition:

PAA:TBPA=about 1 to about 2.5:1;
AO:TBPA=about 1.5 to about 2.0:1; and
KOH:TBPA=about 0.001 to about 0.05:1.

The amount of PAA added to the reaction mixture can be varied to adjust the viscosity of the final diester diol, with higher values within the PAA:TBPA range given above resulting in lower viscosity products. To produce a low viscosity product (about 15,000 to about 50,000 cps at 25° C.), PAA:TBPA mole ratio is generally adjusted to be in the range of about 1.5 to about 2:1

The resultant reaction mixture is then heated under stirring to a temperature of at least 50° C. generally between about 60° C. and about 65° C. to initiate the esterification reaction. Since the reaction is exothermic, the temperature may rise as the reaction proceeds and so cooling is generally applied to the reaction mixture to retain the temperature at or below 120° C. The reaction mixture is then maintained at this temperature for about 2 hours to about 8 hours to complete the reaction. The reaction is terminated when the diester composition has an acid value equal to or less than 0.25 mg KOH/gm, generally between about 0.04 and about 0:10 mg KOH/gm, of the diester composition. After the reaction has been terminated, residual propylene oxide is bled to a scrubber and the reaction mixture held under vacuum to remove volatiles.

The resultant diester diol of tetrabromophthalic acid can be used as a flame retardant for many different polymer resin systems such as polystyrene, high-impact polystyrene (HIPS), poly (acrylonitrile butadiene styrene) (ABS), polycarbonates (PC), PC-ABS blends, polyolefins, polyesters and/or polyamides and polyurethanes. Because of its thermal stability, bromine content and reactivity, the product is particularly useful as a flame retardant for polyurethanes and especially polyurethane foams. In flame retarding polyurethanes, the present diester diol is used as a reactive additive and can be present in the final formulated resin at levels of about 1% to as much as 55%. Preferably, the amounts range from 3 to 30% with a particularly preferable amount ranging from 5 to 15%.

A suitable hindered phenolic antioxidant (c) is one in which the phenolic ring is substituted by an alkanoic acid alkyl ester group in which alkanoic acid moiety has in the range of bout 2 to about 4 carbon atoms and the alkyl group has in the range of about 6 to about 16 carbon atoms. Specific examples of such hindered phenolic compounds include Anox 1315, Anox 70, Anox 330, Naugard 431, and Naugard BHT, all supplied by Chemtura Corporation. There are many other examples of phenolic antioxidants that are available from other suppliers as well.

In addition to the flame retardant components described, it has been found that the physical properties of flexible polyurethane foam may be materially enhanced by incorporation of one or more epoxy resin (b) as an acid scavenger in the polyurethane. Useful epoxy resins are those that do not adversely impact formation of polyurethane from the monomeric reactants of isocyanate and polyol.

Epoxy resin acid scavengers are any materials bearing an epoxy functionality. Such materials are described in The Encyclopedia of Polymer Science and Engineering, 2nd Edition. Vol. 6, pages 225-382. Given the number of materials disclosed therein, and recognizing that the present invention has only recently been made, it can be appreciated that much needs to be done to identify preferred epoxy-bearing components. At this point it has been shown that a particular alicyclic material having a high epoxy function concentration performs well. (The number of epoxy groups relative to the size of the overall molecule is generally expressed as Epoxy Equivalent Weight (EEW), defined as the weight in grams of material which contains one gram equivalent of epoxide.)

While not wishing to be limited, it is reasonable to consider that the preferred epoxy component would be a liquid, such as an epoxy resin, which could be easily and conveniently combined with the flame retardant to form a storage stable flame retardant package.

Suitable epoxy resins for the present blends include, but are not limited to 3,4-epoxycyclohexyloxirane, 2-(3',4'-epoxycyclohexyl)-5,1"-spiro-3",4"-epoxycyclohexane-1,3-dio-xane, bis(3,4-epoxycyclohexylmethyl)adipate, cyclopentene oxide, cyclohexene oxide and 3',4'-epoxycyclohexylmethyl-3,4-epoxycyclohexanecarboxylate. Besides the alicyclic epoxides, it is suggested that the simple aliphatic epoxies such as propylene oxide, butylene oxide, and hexylene oxide may also be desirable because of their low EEW and economy.

The more preferred epoxy resins are selected from the group of cycloaliphatic epoxides, such as a compound having an epoxycyclohexane ring, or even two epoxycyclohexane rings. A particularly preferred cycloaliphatic epoxide is 3',4'-epoxycyclohexylmethyl-3,4-epoxycyclohexane-carboxylate (ERL-4221 as sold by Union Carbide Corporation).

The invention will now be more particularly described with reference to the following non-limiting Examples.

EXAMPLES

Foam samples were prepared by mixing the polyol and flame retardant blends. The remaining components of the formulations, except for the isocyanate, were added and stirred into the polyol/flame retardant mixture. The isocyanate was the last component added and stirred into the mixture.

CONTROL EXAMPLES 24 kg/m³ Combustion Modified Foams

TABLE 1

| Compound | Control (parts/hundred base polyol) |
| --- | --- |
| Polyether Polyol (56.6 OH index)[a] | 100.0 |
| Water | 4.5 |
| Amine catalyst[b] | 0.5 |
| Silicone surfactant[c] | 1.0 |
| Tin catalyst[d] | 0.08 |
| Toluene diisocyanate[e] | 58.42 |
| Brominated diol[f] | 15.0 |

[a]Voranol 235-056, 3000 Mw (The Dow Chemical Company)
[b]Dabco 8264 (Air Products and Chemicals)
[c]Niax L-650 (Momentive Performance Materials GmbH, Leverkusen Germany)
[d]Kosmos 29 (Evonik Industries)
[e]Mondur, Grade A, 80/20, 110 index (Bayer Material Science)
[f]PHT-4 Diol ™ LV (Chemtura Corporation)

The reaction mixture was poured into an 42×42×18 cm box and allowed to expand fully. The box containing the expanded foam was placed in a ventilated 120° C. oven for 20 minutes to accelerate curing. Foam samples were removed from the boxes and placed in a mechanically ventilated fume hood for an additional 8 hours. The top 5 cm of foam was removed as well as the Kraft paper lining the sides of the foam. The foam was then cut and sampled for physical testing such as density and air flow.

Three batches of combustion modified flexible foam were made from the control compounds in Table 1, and were measured for density and airflow according to ASTM D 3574. The control hatches contained no epoxy resin.

Density is the weight per unit volume of the foam normally expressed in kilograms per cubic meter (kg/m³). The control hatches were measured according to ASTM D 3574-05, Test A.

Air flow is defined as the volume of air per second at standard temperature and atmospheric pressure required to maintain a constant pressure differential of 125 Pa across a flexible foam specimen approximately 50×50×25 mm. The control batches were measured according to ASTM D 3574-05. Test G. Units of measure for air flow are expressed in cubic meters per second (M³/min) and standard, cubic feet per minute (SCFM).

TABLE 2

| Batch # | Density (kg/m³) | Airflow (m³/min) | Airflow (SCFM) |
| --- | --- | --- | --- |
| Control 1 | 24.7 | 0.119 | 4.2 |
| Control 2 | 24.8 | 0.088 | 3.1 |
| Control 3 | 24.8 | 0.142 | 5.0 |

The control samples demonstrated relatively high and inconsistent air flow, which is undesirable. Air permeation has a direct effect on foam burn results; as well as, scorch prevention. Inconsistent air permeation within a foam billet (variance greater than 0.5 SCFM or 0.014 m³/min) has the potential to cause flammability failures within rated foam billets and higher foam waste attributable to scorch.

Foam samples were prepared by mixing the polyol and flame retardant blends. The remaining components of the formulations, except for the isocyanate, were added and stirred into the polyol/flame retardant mixture. The isocyanate was the last component added and stirred into the mixture.

TABLE 3

| Compound | Control (parts/hundred base polyol) |
| --- | --- |
| Polyether Polyol (56.6 OH index)[a] | 100.0 |
| Water | 4.5 |
| Amine catalyst[b] | 0.5 |
| Silicone surfactant[c] | 1.0 |
| Tin catalyst[d] | 0.08 |
| Toluene diisocyanate[e] | 58.42 |
| Brominated diol[f] | 15.0 |
| Epoxy resin[g] | 0.3 |

[a]Voranol 235-056, 3000 Mw (The Dow Chemical Company)
[b]Dabco 8264 (Air Products and Chemicals)
[c]Niax L-650 (Momentive Performance Materials GmbH, Leverkusen Germany)
[d]Kosmos 29 (Evonik Industries)
[e]Mondur, Grade A, 80/20, 110 index (Bayer Material Science)
[f]PHT-4 Diol ™ LV (Chemtura Corporation)
[g]ERRL-4221 (Union Carbide Corporation)

The reaction mixture was poured into an 20×20×20 cm box and allowed to expand fully. The box containing the expanded foam was placed in a microwave oven and heated for approximately 4 minutes to simulate scorch conditions in a production scale manufacturing facility. After foam is heated for 4 minutes, it is removed from the microwave oven and box container. Foam samples were placed in a mechanically ventilated fume hood and allowed to cure at room temperature for 30 minutes. The top 5 cm of foam was removed as well as the Kraft paper lining the sides of the foam. The foam was then cut and sampled for scorch testing.

Scorch is defined as polymer degradation and discoloration. It can be caused by excessive heat from the water-isocyanate reaction during foam formation and/or additive induced discoloration within the foam. Scorch is normally indicated by a yellow or brown discoloration; particularly in the center of a foam billet. Foam preparation and scorch testing was performed according to a similar method described in Reale and Jacobs' Predictive Test for Urethane Scorch (Journal of Cellular Plastics 1979; 15: 311).

Combustion modified flexible foam was made from the control compounds in Table 3, and were measured for density and airflow according to ASTM D 3574; as well as, scorch. The control used for testing did not contain hindered phenolic antioxidant.

TABLE 4

| Batch # | Density (kg/m³) | Airflow (m³/min) | Airflow (SCFM) | ΔE[a] | YI D1925[b] |
|---|---|---|---|---|---|
| Control 4 | 23.7 | 0.088 | 3.1 | 17.43 | 27.46 |

[a]ΔE refers to delta E or DE.
[b]YI D1925 refers to Yellowness Index per ASTM Method D 1925.

ΔE or color difference is a measure of how different the material is in color from the standard. A color difference meter is used to give a numerical reading based upon rating three color characteristics—lightness (L), yellowness (b) and redness (a), which are compared to a white color standard. From these numbers, a value for color difference or ΔE can be calculated according to the equation: $\Delta E = (\Delta L^2 + \Delta a^2 + \Delta b^2)^{1/2}$. A change in ΔE signifies a change in color from the white tile standard used by the color difference meter. Higher ΔE numbers signifies more change in color from the white tile standard. Lower ΔE numbers signifies less change in color from the white tile standard. The best ΔE value for a foam would be zero which indicates no color difference measured between foam sample and white tile standard.

YI D1925 refers to Yellowness Index as measured per ASTM Method D 1925. Visually, yellowness is associated with scorching, discoloration and foam degradation. Yellowness indices are used to quantify these types of degradation with a single value. Therefore; higher yellowness index results indicate more color. Lower yellowness index results indicate less color. The best yellowness index value for a foam would be zero which indicates no yellowness detected in foam sample.

Control 4 establishes a baseline reference for discoloration in foam.

INVENTIVE EXAMPLES 24 kg/m³ Combustion Modified Foams

In the following inventive examples, varying amounts of an epoxy resin according to the present application were added to foams formulated and mixed according to the control example listed in Table 1, above. The amount of epoxy resin is expressed as a weight percent relative to the brominated diol content. The combustion modified flexible foams were evaluated for airflow in the same manner as the control examples. The brominated diol was PHT-4 Diol™ LV, sold by Chemtura Corporation corresponding to the structure:

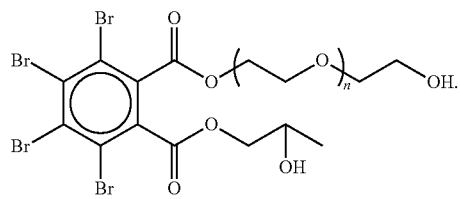

The epoxy resin was 3',4'-epoxycyclohexylmethyl-3,4-epoxycyclohexane-carboxylate (ERL-4221 as sold by Union Carbide Corporation).

TABLE 5

PHT-4 Diol ™ LV/ERL-4221 (1%)

| Example # | Density (kg/m³) | Airflow (m³/min) | Airflow (SCFM) |
|---|---|---|---|
| 1A | 24.8 | 0.076 | 2.7 |
| 1B | 24.3 | 0.062 | 2.2 |
| 1C | 24.3 | 0.048 | 1.7 |

TABLE 6

PHT-4 Diol ™ LV/ERL-4221 (2%)

| Example # | Density (kg/m³) | Airflow (m³/min) | Airflow (SCFM) |
|---|---|---|---|
| 2A | 24.3 | 0.108 | 3.8 |
| 2B | 24.2 | 0.116 | 4.1 |
| 2C | 24.3 | 0.113 | 4.0 |
| 2D | 24.2 | 0.088 | 3.1 |
| 2E | 24.7 | 0.091 | 3.2 |
| 2F | 24.2 | 0.082 | 2.9 |

TABLE 7

PHT-4 Diol ™ LV/ERL-4221 (3%)

| Example # | Density (kg/m³) | Airflow (m³/min) | Airflow (SCFM) |
|---|---|---|---|
| 3A | 24.5 | 0.085 | 3.0 |
| 3B | 24.3 | 0.091 | 3.2 |
| 3C | 24.2 | 0.091 | 3.2 |

TABLE 8

PHT-4 Diol ™ LV/ERL-4221 (4%)

| Example # | Density (kg/m³) | Airflow (m³/min) | Airflow (SCFM) |
|---|---|---|---|
| 4A | 24.7 | 0.074 | 2.6 |
| 4B | 24.5 | 0.122 | 4.3 |
| 4C | 24.5 | 0.082 | 2.9 |

TABLE 9

| | PHT-4 Diol ™ LV/ERL-4221 (5%) | | |
|---|---|---|---|
| Example # | Density (kg/m³) | Airflow (m³/min) | Airflow (SCFM) |
| 5A | 24.5 | 0.099 | 3.5 |
| 5B | 24.3 | 0.065 | 2.3 |
| 5C | 24.5 | 0.125 | 4.4 |

As the data above demonstrates, the present blend not only offers flame retardancy, but also uniform air permeability to any free-rise, slabstock or molded polyurethane foam prepared in the range of 16 kg/m³ to 25 kg/m³, which are highly susceptible to inconsistent air permeability and discoloration within the manufacturing environment.

In the following inventive examples, varying amounts of a hindered phenolic antioxidant according to the present application were added to foams formulated and mixed according to the control example listed in Table 3, above. The amount of hindered phenol is expressed as a weight percent relative to the brominated diol content. The combustion modified flexible foams were evaluated for airflow, density and scorch in the same manner as Control sample #4. The brominated diol was PHT-4 Diol™ LV sold by Chemtura Corporation. The epoxy resin was 3',4'-epoxycyclohexylmethyl-3,4-epoxycyclohexane-carboxylate (ERL-4221 as sold by Union Carbide Corporation). The hindered phenolic antioxidant was 3,5-Bis (1,1-dimethylethyl)-4-hydroxy-benezenepropanoic acid, $C_{13-15}$ alkyl ester (Anox 1315 as sold by Chemtura Corporation).

TABLE 10

| Example # | Density (kg/m³) | Airflow (m³/min) | Airflow (SCFM) | ΔE[a] | YI D1925[b] |
|---|---|---|---|---|---|
| 6 (0.7%) | 23.9 | 0.105 | 3.7 | 17.98 | 28.46 |
| 7 (1.3%) | 24.3 | 0.11 | 3.9 | 4.85 | 6.32 |
| 8 (2.0%) | 24.2 | 0.108 | 3.8 | 11.94 | 18.50 |
| 9 (3.2%) | 23.7 | 0.102 | 3.6 | 14.58 | 22.62 |

[a]ΔE refers to delta E or DE.
[b]YI D1925 refers to Yellowness Index per ASTM Method D 1925.

As the data above demonstrates, the addition of a hindered phenolic antioxidant within the preferred range lowers the amount of discoloration visible in the foam billet. Additionally; flame retardancy and uniform air permeability are added features to any free-rise, slabstock or molded polyurethane foam prepared in the range of 16 kg/m³ to 25 kg/m³.

We claim:

1. A combustion modified flexible polyurethane foam, comprising a polyurethane resin, (a) a diester diol product having a viscosity of 15,000 to about 35,000 cps at 25° C. obtained by reaction of tetrabromophthalic anhydride, diethylene glycol and propylene oxide in a single stage process in the absence of an organic solvent, and (b) at least one epoxy resin comprising at least one cycloaliphatic epoxide, wherein the proportions by weight of components (a) and (b) are in the range of about 98.5:1.5 to about 96.5:3.5,
wherein the combustion modified flexible polyurethane foam has a density in the range of 16 kg/m³ to 25 kg/m³ and uniform permeability that is characterized by a maximum variance in air flow of less than 0.5 standard cubic feet per minute (SCFM) determined by measuring the maximum airflow difference between 3 random measurements over a 50×50×25 mm sample of the combustion modified flexible foam, and wherein the diester diol product is present in the final formulated resin at from 5 to 15% by weight.

2. The flexible polyurethane foam of claim 1, which further comprises (c) at least one hindered phenolic anti-oxidant in which the phenolic ring is substituted by at least one alkanoic alkyl ester group in which the alkanoic acid moiety has from about 2 to about 4 carbon atoms and the alkyl moiety has about 6 to about 16 carbon atoms, wherein the proportions of (c) to (a) plus (b) are in the range of about 0.1:100 to about 1:100.

3. The flexible polyurethane foam of claim 1, wherein component (b) comprises at least one epoxycyclohexane ring.

4. The flexible polyurethane foam of claim 3, wherein component (b) is 3',4'-epoxycyclohexylmethyl-3,4-epoxycyclohexanecarboxylate.

5. The flexible polyurethane foam of claim 2, wherein component (c) is 3,5-Bis(1,1-dimethylethyl)-4-hydroxy-benzenepropanoic acid, $C_{13-15}$ alkyl ester.

* * * * *